(12) United States Patent
Ziskin

(10) Patent No.: US 10,666,351 B2
(45) Date of Patent: May 26, 2020

(54) METHODS AND SYSTEMS FOR LIVE VIDEO BROADCASTING FROM A REMOTE LOCATION BASED ON AN OVERLAY OF AUDIO

(71) Applicant: Drop In, Inc., Los Angeles, CA (US)

(72) Inventor: Louis Ziskin, Playa del Rey, CA (US)

( * ) Notice: Subject to any disclaimer, the term of this patent is extended or adjusted under 35 U.S.C. 154(b) by 0 days.

(21) Appl. No.: 16/319,782

(22) PCT Filed: Jul. 21, 2017

(86) PCT No.: PCT/US2017/043414
§ 371 (c)(1),
(2) Date: Jan. 22, 2019

(87) PCT Pub. No.: WO2018/018029
PCT Pub. Date: Jan. 25, 2018

(65) Prior Publication Data
US 2019/0245609 A1 Aug. 8, 2019

Related U.S. Application Data

(60) Provisional application No. 62/365,359, filed on Jul. 21, 2016.

(51) Int. Cl.
*H04W 4/00* (2018.01)
*H04B 7/185* (2006.01)
*H04L 29/06* (2006.01)
*H04N 21/472* (2011.01)
*H04N 21/2368* (2011.01)
*H04N 21/2187* (2011.01)
*H04N 21/233* (2011.01)
*H04N 21/234* (2011.01)
*H04N 21/242* (2011.01)
(Continued)

(52) U.S. Cl.
CPC ....... *H04B 7/18506* (2013.01); *B64C 39/024* (2013.01); *H04B 7/18504* (2013.01); *H04L 65/1069* (2013.01); *H04L 65/4023* (2013.01); *H04L 65/4084* (2013.01); *H04L 65/605* (2013.01); *H04L 65/608* (2013.01); *H04N 21/2187* (2013.01); *H04N 21/233* (2013.01); *H04N 21/234* (2013.01); *H04N 21/2368* (2013.01); *H04N 21/242* (2013.01); *H04N 21/4307* (2013.01); *H04N 21/47202* (2013.01); *B64C 2201/122* (2013.01); *B64C 2201/127* (2013.01); *H04N 21/214* (2013.01)

(58) Field of Classification Search
USPC .......................... 455/431; 709/226; 725/115
See application file for complete search history.

(56) References Cited

U.S. PATENT DOCUMENTS 9,529,359 B1 * 12/2016 Annan ................. G05D 1/0016
9,894,327 B1 * 2/2018 Jacob ..................... H04N 7/185
(Continued)

OTHER PUBLICATIONS

International Search Report and Written Opinion for PCT Serial No. PCT/US17/43414 dated Oct. 12, 2017.

*Primary Examiner* — David Q Nguyen
(74) *Attorney, Agent, or Firm* — Brooks Acordia IP Law, PC; Pejman Yedidsion

(57) ABSTRACT

Systems, devices, and methods for streaming synchronized video data and audio data from a unmanned aerial vehicle (108) to a requester device (102) based on an operator device (106) overlaying the video data and audio data.

20 Claims, 6 Drawing Sheets

(51) Int. Cl.
    *B64C 39/02*     (2006.01)
    *H04N 21/43*     (2011.01)
    *H04N 21/214*     (2011.01)

(56) References Cited

U.S. PATENT DOCUMENTS

| | | | |
|---|---|---|---|
| 9,927,809 B1* | 3/2018 | Tofte | G05D 1/0038 |
| 9,948,380 B1* | 4/2018 | Vos | H04B 7/18506 |
| 2002/0049852 A1 | 4/2002 | Lee et al. | |
| 2009/0012995 A1 | 1/2009 | Sartor et al. | |
| 2009/0273671 A1 | 11/2009 | Gardner | |
| 2010/0174753 A1 | 7/2010 | Goranson | |
| 2010/0224732 A1 | 9/2010 | Olson et al. | |
| 2010/0302359 A1 | 12/2010 | Adams et al. | |
| 2011/0055394 A1* | 3/2011 | Bi | H04L 67/104 |
| | | | 709/226 |
| 2012/0117605 A1* | 5/2012 | Miao | H04L 65/4084 |
| | | | 725/115 |
| 2013/0073775 A1 | 3/2013 | Wade et al. | |
| 2015/0062339 A1 | 3/2015 | Ostrom | |
| 2016/0054737 A1 | 2/2016 | Soli et al. | |
| 2016/0205418 A1 | 7/2016 | Ho | |
| 2016/0295246 A1 | 10/2016 | Laksono et al. | |
| 2016/0332747 A1 | 11/2016 | Bradlow et al. | |
| 2016/0366212 A1* | 12/2016 | Lee | H04L 67/06 |
| 2017/0039765 A1 | 2/2017 | Zhou et al. | |
| 2017/0053674 A1 | 2/2017 | Fisher et al. | |
| 2017/0055004 A1 | 2/2017 | Krietzman et al. | |
| 2017/0201714 A1 | 7/2017 | Kim et al. | |
| 2017/0214945 A1 | 7/2017 | Chang | |
| 2018/0050800 A1 | 2/2018 | Boykin et al. | |
| 2018/0249168 A1* | 8/2018 | Loyd | H04N 19/46 |

* cited by examiner

METHODS AND SYSTEMS FOR LIVE VIDEO BROADCASTING FROM A REMOTE LOCATION BASED ON AN OVERLAY OF AUDIO

CROSS-REFERENCE TO RELATED APPLICATIONS

This application is a 35 U.S.C. § 371 National Stage Entry of International Application No. PCT/US2017/043414, filed Jul. 21, 2017, which claims priority to and benefit of Provisional Patent Application No. 62/365,359 filed Jul. 21, 2016, all of which are hereby incorporated by reference herein for all purposes.

TECHNICAL FIELD OF ENDEAVOR

The invention relates to the field of video streaming, more particularly, integrating video data from a remote source with audio data in order to broadcast a synchronized set of video data and audio data to destination.

BACKGROUND

An unmanned aerial vehicle (UAV) or drone, may operate with various degrees of autonomy: either under remote control by a human operator, or fully or intermittently autonomously, by onboard computers. While in flight, UAVs are typically equipped with image capturing devices, such as digital camera for capturing video and often have the ability to transmit the video live to a computing device on the ground, where the computing device may or may not be the same device that is being used to control the UAV's flight path.

SUMMARY

Embodiments may include methods, systems, and devices where, for example, a device embodiment may include a processor and addressable memory, the addressable memory comprising a set of one or more rules, where the first computing device may be in communication with a second computing device comprising a processor and addressable memory; and where the first computing device may be configured to: receive, from the second computing device, a request to communicate with an unmanned aerial vehicle (UAV), where the request comprises a request for video data streaming; establish a first communication channel with the UAV for receiving streamed data from the UAV based on the received request, where the streamed data may be transmitted by the UAV as uncompressed data; encode the uncompressed data received from the UAV via the first communication channel; establish a second communication channel for transmitting streamed video data and audio data from the first computing device to the second computing device; synchronize audio data received from the first computing device and the second computing device with the encoded data received from the UAV; where the synchronization of the streamed video data and audio data may be based on combining the first communication channel and the second communication channel via an overlay process; and stream the video data and audio data between the first computing device and the second computing device based on the encoded and synchronized data.

In one embodiment, the first computing device may be further configured to stream the video data received from the UAV and the audio data on the same communication channel. Optionally, the audio data received from the first computing device may be via a microphone in communication with the processor at the first computing device and the audio data received from the second computing device may be via a microphone in communication with the processor at the second computing device. Optionally, the request further comprises a request for audio data streaming. In addition, the uncompressed data received from the UAV may further comprise audio data.

In one embodiment, the first computing device may be further configured to communicate with a server computing device where the first computing device may be further configured to transmit the uncompressed data from the UAV directly to the server computing device for processing and the first computing device may be between the server computing device and the second computing device, thereby the device is in communication with the UAV, server computing device, and second computing device via a set of communication channels. Optionally, the first computing device may utilize a separate processor to receive uncompressed data form the UAV and transmit audio data to the second computing device. In addition, the first computing device may further comprise a data store for logging a set of associated information for each communication channel.

Embodiments include methods, systems, and devices where, for example a method embodiment may include the steps of: (a) receiving, by a first computing device having a processor and addressable memory, a request from a second computing device having a processor and addressable memory, for communicating with an unmanned aerial vehicle (UAV) having a processor and addressable memory, where the request for communication comprises a request for video data streaming; (b) establishing, by the first computing device, a first communication channel with the UAV for receiving streamed data from the UAV based on the received request, where the streamed data is transmitted by the UAV as uncompressed data; (c) encoding, by the first computing device, the uncompressed data received from the UAV via the first communication channel; (d) establishing, by the first computing device, a second communication channel for transmitting streamed video data and audio data from the first computing device to the second computing device; (e) synchronizing, by the first computing device, audio data received from the first computing device and audio data received from the second computing device with the encoded data received from the UAV; where the synchronization of the streamed video data and audio data is based on combining the first communication channel and the second communication channel via an overlay process; and (f) streaming, by the first computing device, the video data and audio data between the first computing device and the second computing device based on the encoded and synchronized data.

Optionally, a server computing device may be in communication with the first computing device and the second computing device. In some embodiments, the method may further include the step of: generating, by the server computing device, a unique identifier associated with the second computing device requesting video data streaming and audio data streaming; and providing, by the server computing device, the request to communicate with the UAV and the generated unique identifier based on the request. Additionally, the method may include sending, by the server computing device, the unique identifier along with the request to the first computing device.

Other embodiments include methods, systems, and devices where, for example a system embodiment may include: (i) a server computing device, (ii) a first computing device, and (iii) a second computing device; where the second computing device comprises a processor and addressable memory, the processor configured to: send a request to the first computing device for communicating with an unmanned aerial vehicle (UAV), where the request comprises a request for video data streaming; where the server computing device comprises a processor and addressable memory, the processor configured to: generate a unique identifier associated with the second computing device requesting video data streaming and audio data streaming; and provide the request to communicate with the UAV and the generated unique identifier based on the request; and where the first computing device comprises a processor and addressable memory, the processor configured to: receive, from the second computing device, the request; establish a first communication channel with the UAV for receiving streamed data from the UAV based on the received request, where the streamed data is transmitted by the UAV as uncompressed data; encode the uncompressed data received from the UAV via the first communication channel; establish a second communication channel for transmitting streamed video data and audio data from the first computing device to the second computing device; synchronize audio data received from the first computing device and the second computing device with the encoded data received from the UAV; where the synchronization of the streamed video data and audio data is based on combining the first communication channel and the second communication channel via an overlay process; and stream the video data and audio data between the first computing device and the second computing device based on the encoded and synchronized data.

BRIEF DESCRIPTION OF DRAWINGS

Embodiments are illustrated by way of example and not limitation in the figures of the accompanying drawings, which may not be drawn to scale, and in which.

DETAILED DESCRIPTION

Figure 1A:
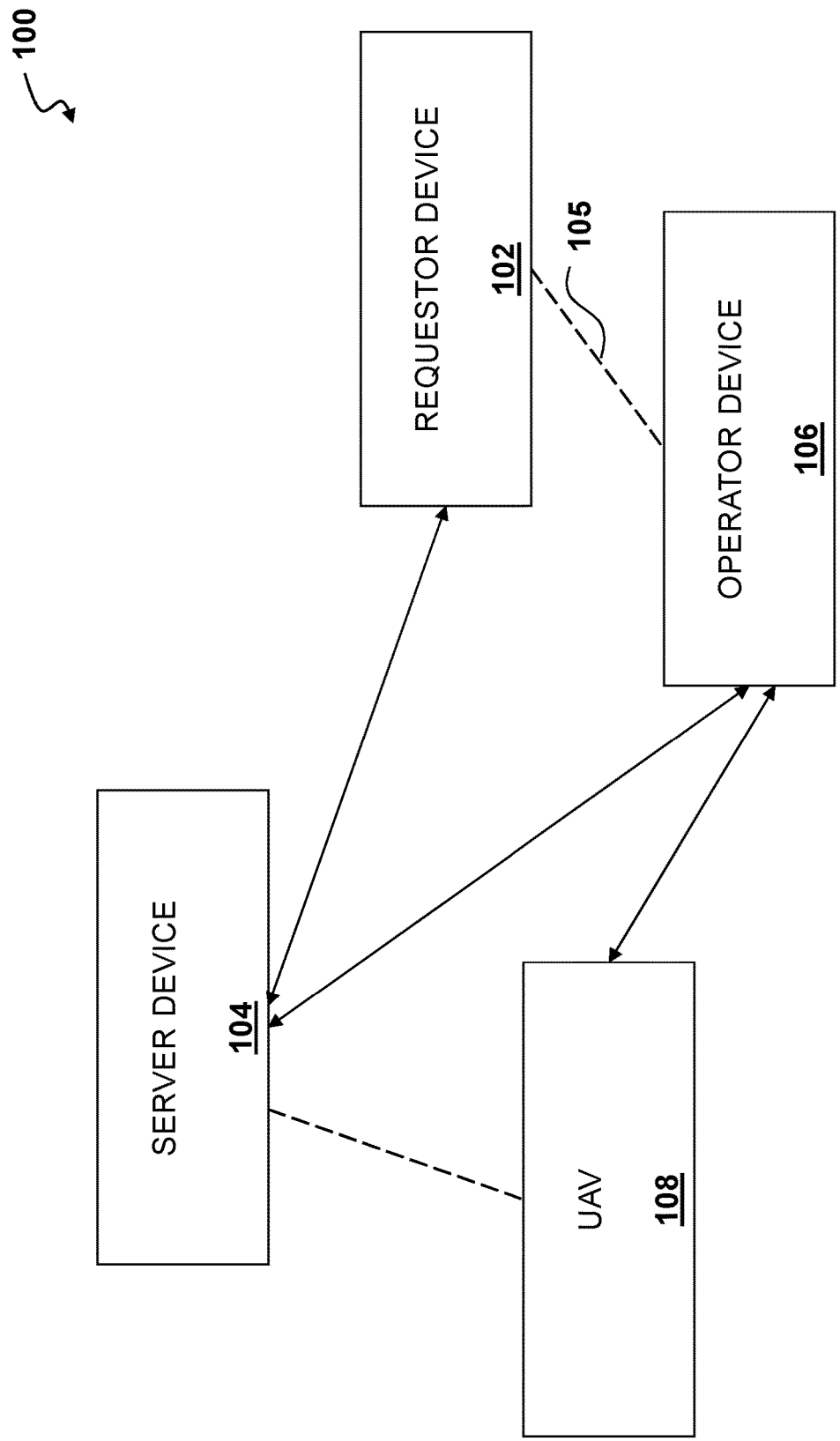
FIG. 1A depicts an exemplary functional block diagram of the system.

Exemplary embodiments of the system for live video and audio broadcasting from a remote location comprise: a requestor device comprising an operating system and a data store, an operator device comprising an operating system and a data store, an unmanned aerial vehicle (UAV) where the UAV may be an aircraft without a human pilot aboard, and a server computing device comprising an operating system and a data store. The system effects streaming of live video and audio based on a request received from a consumer or user via their requestor device. The devices may comprise an application program (app) running on the operating system to process streaming of video and audio captured by the operator device. According to this embodiment, the requestor device transmits the request to the operator device which in turn communicates the request to the UAV. The UAV, in response, may initiate a video feed for live broadcasting from that location via a communication medium established between the operator device and the UAV. The operator device may then overlay any audio data being recorded simultaneously on to the video data feed as real-time or near real-time. That is, the operator device, for example, a user equipment that may be a mobile device, may synchronize the video data with the audio data via an exemplary overlay process. In an exemplary embodiment of a computing device performing overlay functions, the device may provide a method of associating audio data to a video data stream with a dedicated memory buffer inside the computing device thereby improving the synchronization mechanism. Additionally, the overlay may be executed via a dedicated buffer into which one app running on the device may render, typically video data, representation of the video while overlapping the rendering with audio by the app.

The operator device may then communicate, via a two-way communication scheme, the video and audio stream along with a set of associated information to the requestor device which will then be able to view the video live and transmit audio back to the operator device. Two-way communication may be in a form of transmission in which both parties involved transmit information to each other by exchanging data. This may be by wired interconnects and wireless interconnects and utilizing computing devices that both transmit and receive, e.g., a transceiver. The operator device may then receive the audio data on the same communication channel as the one already opened for the broadcasting of the video data & audio data by the operator device or server device. Accordingly, the requestor device may communicate audio containing instructions from the user to the operator device which may then control the UAV's flight path, capture angle, etc.

In one embodiment, the operator device may transmit the video data, audio data, and associated information to the requestor device via the server computing device and via, for example, wireless WiFi®, wireless local area network (WLAN), or other wireless networks with broadcast methods such as Long Term Evolution (LTE), Bluetooth, and/or any other hardware or software radio broadcast methods. The server computing device may connect and work with any such devices that may use LTE or WLAN, for example, mobile phones, specifically smartphones, personal computers, video game consoles, tablets, televisions, and/or digital cameras, to connect to a network resource such as the Internet via wired or wireless communication. In one embodiment, the system may manage a large number of devices in a crowded environment, so as to process multiple requests from consumers, where each of the multiple requests may specify a location that is needed to be travelled to and capture live or recorded video and/or audio at that location. Embodiments of the computing system may determine a ranking of operator devices based on prior history of the operator, assigning a score to each responding operator device based on the history and then select a set of available operators within range of the desired location. Accordingly, the system may rank operator device users based on distance, rating, and provider score in order to dispatch the highest ranked operator first.

In one embodiment, by integrating audio data from the operator device with video data received from the UAV, the broadcasting of the video data may be supplemented by audio narrative on the same channel and without the need to open or establish other mediums for transmission. Exemplary embodiments may utilize a compass, magnetometer, gyroscopic sensors, accelerometer, proximity sensors, or other sensors to obtain, for example, GPS information, that may be synchronized with each other. That is, the set of associated information comprising the aforementioned data, may be gathered from the UAV and operator device which are in communication with each other. The aforementioned data may therefore be transmitted to the server computing device, comprising a processor and memory, for processing and broadcasting to one or more requestor devices, where the devices enable users to view and control the video data. Accordingly, one user may be able to then send voice commands to another user, who will control the UAV. This may be done in real-time or the device may keep real time stats and integrate the data at a later time.

In one embodiment of the system, users may live broadcast the video data feed from the UAV, specifically over the Internet via a live stream. The broadcast may be a one to one (1-to-1) or one-to-many type that is capable of privately or publicly broadcasting. The system may enable anyone to broadcast their voice publicly or privately to viewers, with minimal delay. In an alternative embodiment, as opposed to a live stream, the system may record the audio and video, data, save the data for a specified time period, and broadcast the integrated video and audio data at a later time. Accordingly, a user may, in accordance with the embodiments of this application, use the computing system to integrate, via a synchronization or overlay scheme, the audio and video data from a broadcasting user with a set of media content from the broadcasting user, while utilizing a compression scheme—encoder/decoder—to create a new formatted content data.

An exemplary device having capabilities of broadcasting user audio, may compress the video data (using any conversion formatting necessary for encoding information using fewer bits than the original representation) before transmission or alternatively, send the raw data to another device, for example, server computing device, to perform the compression. Since typically UAV's do not have processing power to encode the video data, data feed coming from an exemplary UAV will most likely comprise high definition (HD) uncompressed data which may require high bandwidth and tremendous processing. Uncompressed video data is digital video that either has not been compressed and may be conveyed over various types of baseband digital video interfaces, for example, HDMI, DVI, DisplayPort and SDI. However, when video is conveyed over a network, communication disruptions or diminished bandwidth may corrupt the video or prevent its transmission. According to the disclosed system for live video broadcasting based on an overlay of audio, the received uncompressed HD video data may be compressed and then displayed on the remote operating device's display. The remote operating device, for example, a user equipment or mobile device, may function as the encoder while the appropriate processing power may be used for video compression. A number of encoding or compression techniques may be used as is well known in the art.

Once an exemplary encoder—residing on the operating device or optionally on a remote server—has processed the data, it may then go through steps of a format conversion/aspect ratio conversion before transmission. The integration of the audio data with the video data may also be performed by a processor or an encoder where the data is overlayed together, for example, one set of bytes may be inserted after another while the same file or a separate file may contain the associated synchronization data information. That is, the data may be reconstructed at the decoder so that the data may be displayed by replicating on the receiving device. The operator or user of the receiving device may then be able to not only view the vide data being streamed in real-time but also communicate with the operator or user of the operating device in real-time.

In one embodiment, the data communication between the devices may be via, for example, a User Datagram Protocol (UDP) which is a transport layer protocol defined for use with the IP network layer protocol. In one exemplary embodiment, a push data mechanism may be implemented via TCP/IP protocols and the line tracking time updates may be sent in real-time. Each mobile device may comprise an embedded web application server that may allow executable applications or scripts, e.g., application software, that may be available in versions for different platforms and are to be executed on the mobile device. Applications may be developed to support various mobile devices and their respective operating systems such as: iOS, Android, and Windows.

FIG. 1A depicts a functional block diagram of an exemplary system 100 where the requestor device 102 sends a request to the server device 104 for video and audio streaming. The server device may then select an operator device 106 which may be capable of fulfilling the request based on a number of attributes. The operator device then may establish a communication channel with an exemplary UAV 108 that is capable of streaming live video to the operator device 106. The operator device 106 may then process streaming of video from the UAV 108 and audio captured by the operator device 106. One embodiment of the system may perform the processing of the streaming video from the UAV 108 by remote observance or control of operator device 106 that is connected to a network with internet access (or local network if applicable) via an activated screen sharing technology. Screen sharing may be performed via, for example, a VNC client, that may also be used to control any computer running a VNC server if the IP address of the target computer is known and accessible. Subsequent to the video data sharing, the operator device 106 may overlay any audio data being recorded or detected by the operator device 106 simultaneously on to the video data feed as real-time or near real-time. That is, the operator device 106 may synchronize the video data with the audio data via an exemplary overlay process and then transmit to the server device 104 or optionally, to the requester device 102 directly. Since the remote screen capture or screen sharing may also include audio data received from the UAV 108, the operator device 106 may additionally perform a synchronization of the multiple audio feeds, for example: audio data received from UAV 108, audio data received from the requestor device 102, and audio data captured by the microphone of the operator device 106. The audio communication channel may then allow the requestor device or devices to provide real-time instructions to the operator device 106—who's user may be operating the UAV 108.

In another exemplary embodiment, the operator device 106 may transmit the data to a server device 104, where the server device 104 may function to process the data in conjunction with or separate from the operator device 106, and additionally perform other services, such as error correction, before sending the live stream with audio to the requestor device 102. The server device 104 in his embodiment may also function to generate a unique identifier associated with the requester device 102 requesting video data streaming and audio data streaming. The server device 104 may then provide the generated unique identifier to the operator device 106 to establish a direct communication channel 105 for transmitting video and audio data directly between the requestor device 102 and operator device 106, based on the generated unique identifier, thereby establishing a separate communication channel 105 for transmitting streamed video and audio data from the UAV 108 and the operator device 106 to the requester device 102. Accordingly, the streamed data may be transmitted based on the generated unique identifier and via combining the uncompressed video data and audio data from the UAV, the encoded video data and synchronized audio data from the operator device 106, and the audio data from the requestor device 102.

In an alternate embodiment, the exemplary UAV may be in communication with separate control hardware via a hardware cable, for example, a Thunderbolt or any such high bandwidth data connection, where the operator device interfaces with the UAV control hardware that may have a video feed receiver and receiving the video image data. That is, the UAV may comprise a control hardware component separate and apart from the body of the UAV itself, where the UAV may transmit video data directly to the control hardware component, thereby allowing the operator device's transcoder and audio/video compositor to be directly linked, via the exemplary Thunderbolt connector. According to this embodiment, an image-capturing device on the UAV may transmit the video image data to the control hardware component for the operator device receiver/relay and the control hardware component may then transfer the data via the data connection, e.g., wired connector, to the operator device, e.g., mobile phone, via a transcoder and audio/video compositor running on the operator device.

Figure 1B:
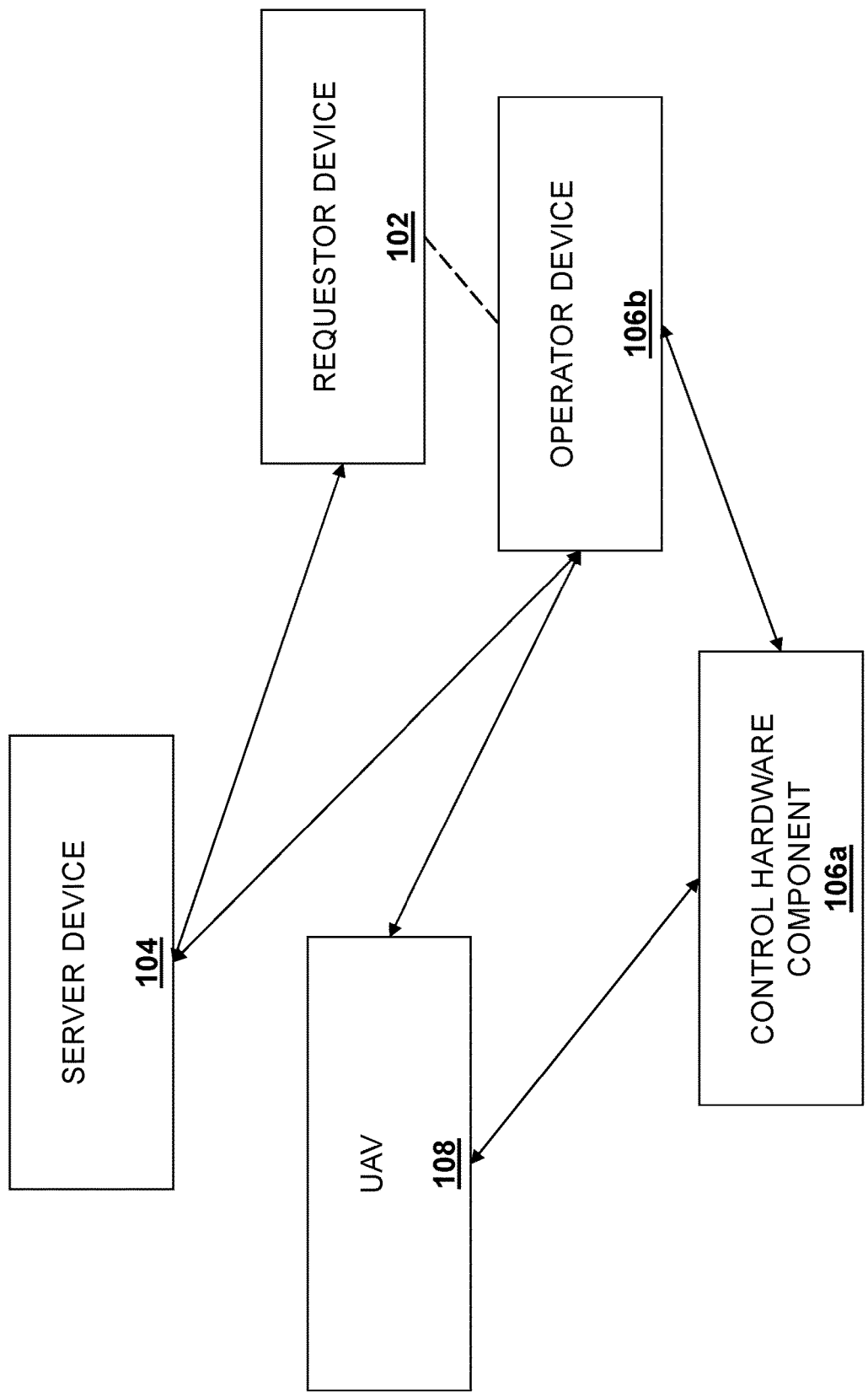
FIG. 1B depicts an alternate exemplary functional block diagram of the system.

FIG. 1B depicts a functional block diagram of an exemplary system 110 where the requestor device 102 sends a request to the server device 104 for video and audio streaming. The server device may then select an operator device 106b which may be capable of fulfilling the request based on a number of attributes. The operator device 106b may then establish a communication channel with an exemplary UAV 108 that is capable of streaming live video to the operator device 106b or alternatively, to a control hardware component 106a. The control hardware component 106a may then send the video data received from the UAV 108 to the operator device 106b, via a transcoder and audio/video compositor running on the operator device 106b. The operator device 106b may then process streaming of video from the control hardware component 106a and audio captured by the operator device 106b. The operator device 106b may overlay any audio data being recorded simultaneously on to the video data feed as real-time or near real-time. That is, the operator device 106b may synchronize the video data with the audio data via an exemplary overlay process and then transmit to the server device 104 or optionally, to the requester device 102 directly. In the embodiment where the operator device 106b transmits the data to the server device 104, the server device 104 may function to process the data and perform other services, such as error correction, before sending the live stream with audio to the requestor device 102.

Figure 2:
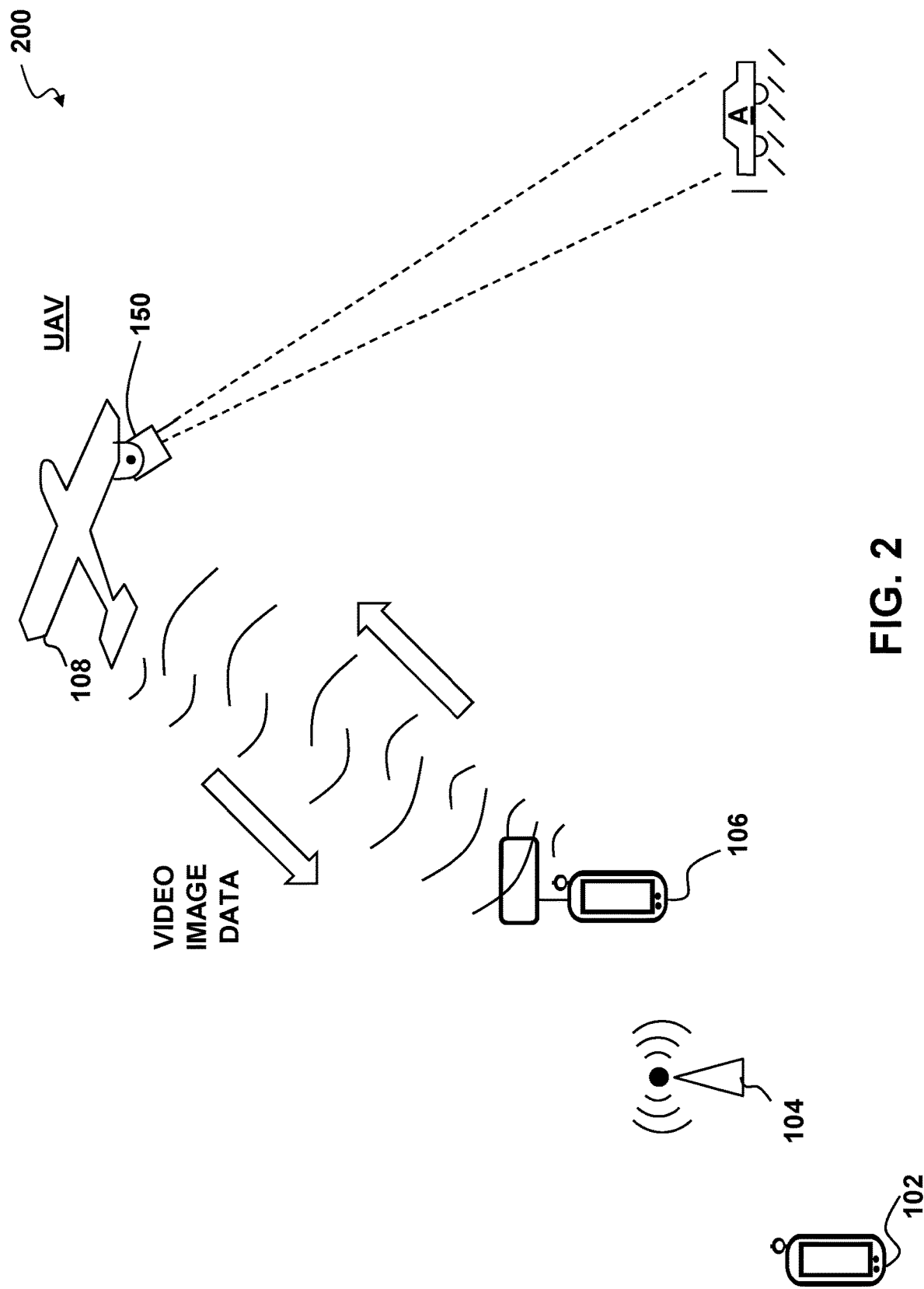
FIG. 2 depicts an exemplary functional block diagram of the system where a UAV is flying over an area and recording video of an object.

FIG. 2 depicts a functional block diagram of the system where a UAV 108 is flying over an area and recording video of an object, for example, a car, while then transmitting the video image data to the operator device 106. The operator device may then communicate, via a two-way communication scheme through the server device 104, the video and audio stream along with a set of associated information to the requestor device 102 which will then be able to view the video live and transmit audio back to the operator device 106. The may be done via the server device 104 determining and assigning a unique identifier (ID) to each transmission channel in order to track the devices and their potential communication. In this embodiment, the server device 104 may identify the transmitted data to the requester device 102 and operator device 106 based on the unique IDs. Two-way communication may be in a form of transmission in which both parties involved transmit information to each there by exchanging data. The communication may be shown as a wireless communication that may use, for example, a transceiver. The operator device 106 may then receive the audio data on the same communication channel as the one already opened for the broadcasting of the video data and audio data by the operator device 106 or server device 104, based on the unique identifier. Accordingly, the requestor device 102 may communicate audio containing instructions from the user to the operator device 106 which may then control the UAV's 108 flight path or capture angle 150.

Figure 3:
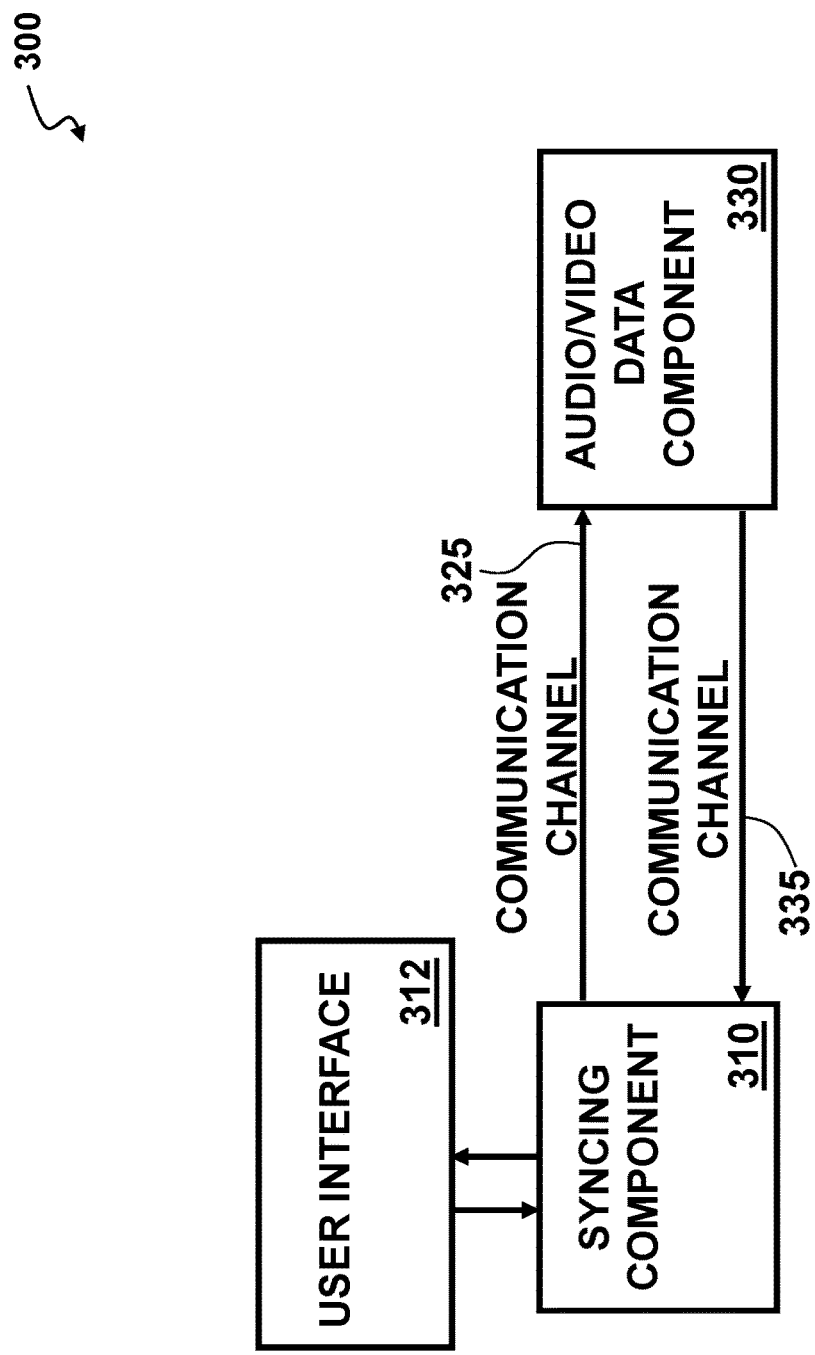
FIG. 3 depicts an exemplary operator device that may be capable of integrating audio data from the operator device itself with video data received from the UAV, via a syncing component.

FIG. 3 depicts an operator device 300 that may be capable of integrating audio data from the operator device itself with video data received from the UAV, via a syncing component 310, and received user input from a user interface 312. That is, the received video data may be supplemented by audio narrative on the same communication channel and without the need to open or establish other mediums for transmission. The syncing process may be performed where data may be overlayed before being transmitted to a server computing device (not shown) for processing and broadcasting to one or more requestor devices, where the devices enable users to view and control the video data. Accordingly, one user may be able to then send voice commands to another user, who will control the UAV. Additionally, the audio/video data component 330 of the operator device may receive data from the other devices: requestor and UAV, and communicate those internally to the syncing component 310 via multiple communication channels 325, 335. The syncing component 310 may distinguish between audio data received from the operator device itself and audio data from requestor devices and play the audio received from the requestor device and sync the audio received from the operator device with the video data received from the UAV.

Figure 4:
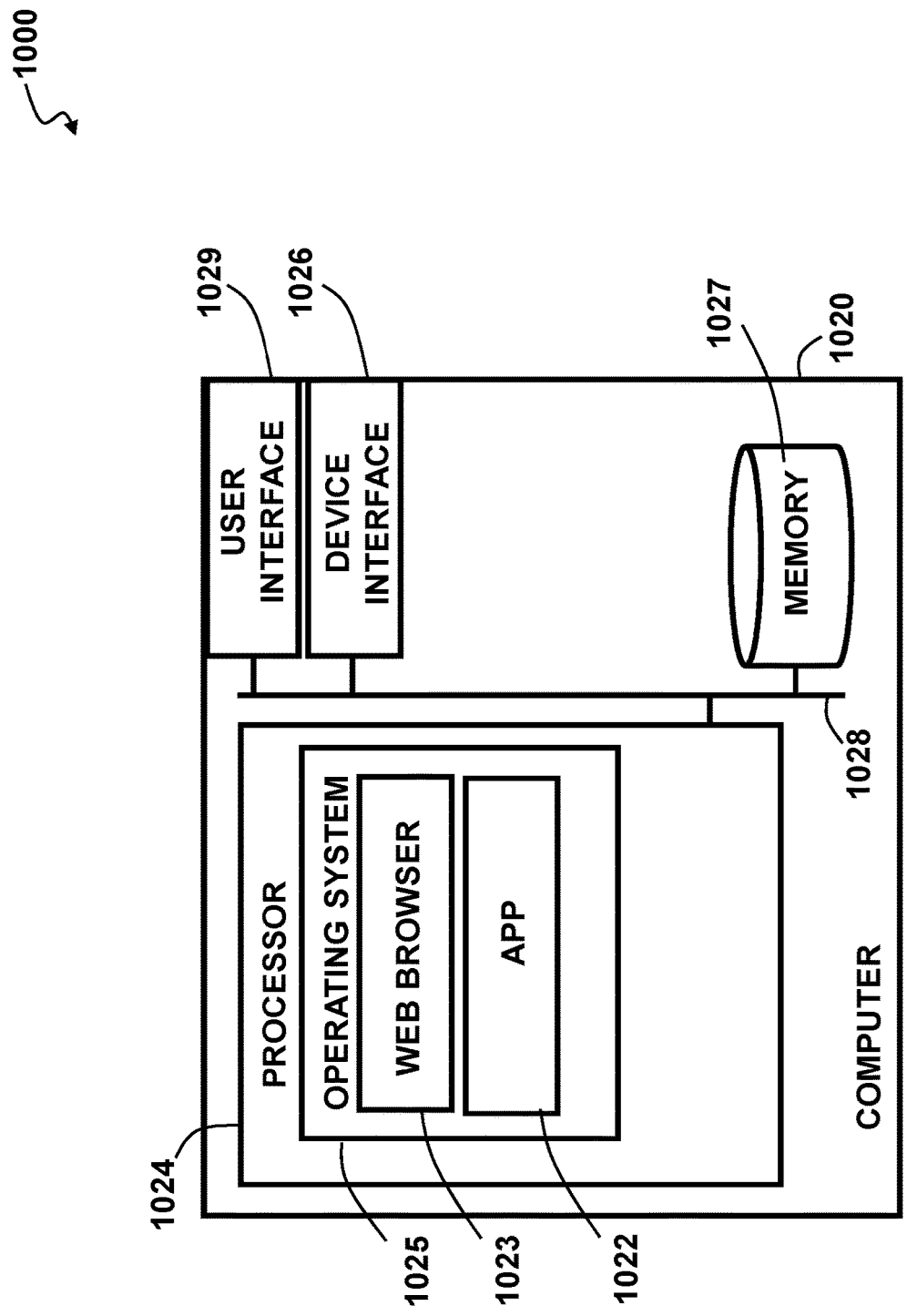
FIG. 4 illustrates an exemplary top level functional block diagram of a computing device.

FIG. 4 illustrates an exemplary top level functional block diagram of a computing device embodiment 1000. The exemplary operating environment is shown as a computing device 1020 comprising a processor 1024, such as a central processing unit (CPU), addressable memory 2027, an external device interface 2026, e.g., an optional universal serial bus port and related processing, and/or an Ethernet port and related processing, and an optional user interface 2029, e.g., an array of status lights and one or more toggle switches, and/or a display, and/or a keyboard and/or a pointer-mouse system and/or a touch screen. Optionally, the addressable memory may for example be: flash memory, eprom, and/or a disk drive or other hard drive. These elements may be in communication with one another via a data bus 1028. Via an operating system 1025, such as one supporting a web browser 1023 and applications 1022, the processor 1024 may be configured to execute steps of a live video broadcast from a remote location based on an overlay of audio according to the exemplary embodiments described above.

Figure 5:
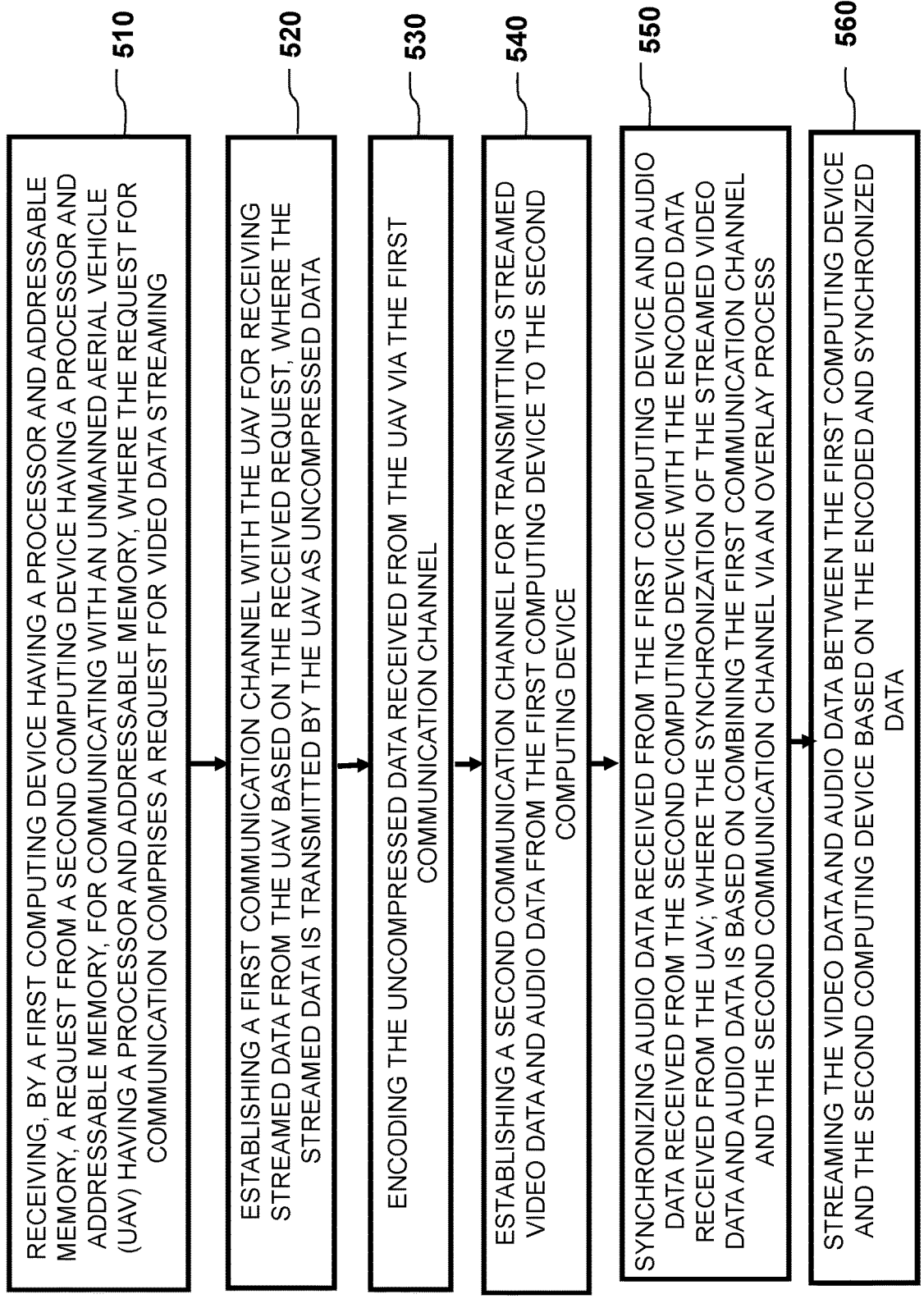
FIG. 5 is a flowchart depicting an exemplary process establishing a communication channel.

FIG. 5 is a flowchart of an exemplary process 500 establishing a communication channel in which the system comprises a computer and/or computing circuitry that may be configured to execute the steps as depicted. The method depicted in the flowchart includes the steps of: (a) receiving, by a first computing device having a processor and addressable memory, a request from a second computing device having a processor and addressable memory, for communicating with an unmanned aerial vehicle (UAV) having a processor and addressable memory, where the request for communication comprises a request for video data streaming (step 510); (b) establishing, by the first computing device, a first communication channel with the UAV for receiving streamed data from the UAV based on the received request, where the streamed data is transmitted by the UAV as uncompressed data (step 520); (c) encoding, by the first computing device, the uncompressed data received from the UAV via the first communication channel (step 530); (d) establishing, by the first computing device, a second communication channel for transmitting streamed video data and audio data from the first computing device to the second computing device (step 540); (e) synchronizing, by the first computing device, audio data received from the first computing device and audio data received from the second computing device with the encoded data received from the UAV; where the synchronization of the streamed video data and audio data is based on combining the first communication channel and the second communication channel via an overlay process (step 550); and (f) streaming, by the first computing device, the video data and audio data between the first computing device and the second computing device based on the encoded and synchronized data (step 560).

The illustrations and examples provided herein are for explanatory purposes and are not intended to limit the scope of the appended claims. This disclosure is to be considered an exemplification of the principles of the invention and is not intended to limit the spirit and scope of the invention and/or claims of the embodiment illustrated. It is contemplated that various combinations and/or sub-combinations of the specific features, systems, methods, and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention herein disclosed by way of examples should not be limited by the particular disclosed embodiments described above.

What is claimed is:

1. A first computing device comprising a processor and addressable memory, the addressable memory comprising a set of one or more rules, wherein the first computing device is in communication with a second computing device comprising a processor and addressable memory; and wherein the first computing device is configured to:
   receive, from the second computing device, a request to communicate with an unmanned aerial vehicle (UAV), wherein the request comprises a request for video data streaming;
   establish a first communication channel with the UAV for receiving streamed data from the UAV based on the received request, wherein the streamed data is transmitted by the UAV as uncompressed data;
   encode the uncompressed data received from the UAV via the first communication channel;
   establish a second communication channel for transmitting streamed video data and audio data from the first computing device to the second computing device;
   synchronize audio data received from the first computing device and the second computing device with the encoded data received from the UAV; wherein the synchronization of the streamed video data and audio data is based on combining the first communication channel and the second communication channel via an overlay process, thereby supplementing the streamed video data with audio data, the audio data representing audio narrative from the first computing device and the second computing device; and
   stream the video data and audio data between the first computing device and the second computing device based on the encoded and synchronized data.

2. The first computing device of claim 1 further configured to stream the video data received from the UAV and the audio data on the same communication channel.

3. The first computing device of claim 1 wherein the audio data received from the first computing device is via a microphone in communication with the processor at the first computing device.

4. The first computing device of claim 1 wherein the audio data received from the second computing device is via a microphone in communication with the processor at the second computing device.

5. The first computing device of claim 1 wherein the request further comprises a request for audio data streaming.

6. The first computing device of claim 5 wherein the uncompressed data received from the UAV further comprises audio data.

7. The first computing device of claim 6 wherein the first computing device is further configured to communicate with a server computing device.

8. The first computing device of claim 7 wherein the first computing device is further configured to transmit the uncompressed data from the UAV directly to the server computing device for processing.

9. The first computing device of claim 8 wherein the first computing device is between the server computing device and the second computing device, thereby the device is in communication with the UAV, server computing device, and second computing device via a set of communication channels.

10. The first computing device of claim 1 wherein the first computing device utilizes a separate processor to receive uncompressed data form the UAV and transmit audio data to the second computing device.

11. The first computing device of claim 1 wherein the first computing device further comprises a data store for logging a set of associated information for each communication channel.

12. A method comprising:
   receiving, by a first computing device having a processor and addressable memory, a request from a second computing device having a processor and addressable memory, for communicating with an unmanned aerial vehicle (UAV) having a processor and addressable memory, wherein the request for communication comprises a request for video data streaming;
   establishing, by the first computing device, a first communication channel with the UAV for receiving streamed data from the UAV based on the received request, wherein the streamed data is transmitted by the UAV as uncompressed data;
   encoding, by the first computing device, the uncompressed data received from the UAV via the first communication channel;
   establishing, by the first computing device, a second communication channel for transmitting streamed video data and audio data from the first computing device to the second computing device;

synchronizing, by the first computing device, audio data received from the first computing device and audio data received from the second computing device with the encoded data received from the UAV; wherein the synchronization of the streamed video data and audio data is based on combining the first communication channel and the second communication channel via an overlay process, thereby supplementing the streamed video data with audio data, the audio data representing audio narrative from the first computing device and the second computing device; and streaming, by the first computing device, the video data and audio data between the first computing device and the second computing device based on the encoded and synchronized data.

13. The method of claim 12 wherein a server computing device is in communication with the first computing device and the second computing device.

14. The method of claim 13 further comprising:
generating, by the server computing device, a unique identifier associated with the second computing device requesting video data streaming and audio data streaming.

15. The method of claim 14 further comprising:
providing, by the server computing device, the request to communicate with the UAV and the generated unique identifier based on the request.

16. The method of claim 15 further comprising:
sending, by the server computing device, the unique identifier along with the request to the first computing device.

17. The method of claim 16 further comprising:
receiving, by the server computing device, uncompressed data from the UAV via the first computing device.

18. The method of claim 12 wherein the request further comprises a request for audio data streaming.

19. The method of claim 12 wherein the first computing device is between the server computing device and the second computing device, thereby the device is in communication with the UAV, server computing device, and second computing device via a set of communication channels.

20. A system comprising a server computing device, a first computing device, and a second computing device;

wherein the second computing device comprises a processor and addressable memory, the processor configured to:
send a request to the first computing device for communicating with an unmanned aerial vehicle (UAV), wherein the request comprises a request for video data streaming;

wherein the server computing device comprises a processor and addressable memory, the processor configured to:
generate a unique identifier associated with the second computing device requesting video data streaming and audio data streaming; and
provide the request to communicate with the UAV and the generated unique identifier based on the request; and wherein the first computing device comprises a processor and addressable memory, the processor configured to:
receive, from the second computing device, the request;
establish a first communication channel with the UAV for receiving streamed data from the UAV based on the received request, wherein the streamed data is transmitted by the UAV as uncompressed data;
encode the uncompressed data received from the UAV via the first communication channel;
establish a second communication channel for transmitting streamed video data and audio data from the first computing device to the second computing device;
synchronize audio data received from the first computing device and the second computing device with the encoded data received from the UAV; wherein the synchronization of the streamed video data and audio data is based on combining the first communication channel and the second communication channel via an overlay process; and
stream the video data and audio data between the first computing device and the second computing device based on the encoded and synchronized data, thereby supplementing the streamed video data with audio data, the audio data representing audio narrative from the first computing device and the second computing device.

* * * * *